(12) United States Patent
Anderson

(10) Patent No.: US 12,267,293 B2
(45) Date of Patent: *Apr. 1, 2025

(54) NETWORK ADDRESS TRANSLATION FOR VIRTUAL MACHINES

(71) Applicant: Google LLC, Mountain View, CA (US)

(72) Inventor: Evan K. Anderson, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,635

(22) Filed: Jan. 17, 2024

(65) Prior Publication Data

US 2024/0154930 A1     May 9, 2024

Related U.S. Application Data

(63) Continuation of application No. 17/092,192, filed on Nov. 6, 2020, now Pat. No. 11,909,712, which is a
(Continued)

(51) Int. Cl.
| | |
|---|---|
| *H04L 61/256* | (2022.01) |
| *G06F 9/455* | (2018.01) |
| *H04L 49/00* | (2022.01) |
| *H04L 61/2503* | (2022.01) |
| *H04L 61/2517* | (2022.01) |

(Continued)

(52) U.S. Cl.
CPC ........ *H04L 61/256* (2013.01); *G06F 9/45558* (2013.01); *H04L 49/3009* (2013.01); *H04L 61/2503* (2013.01); *H04L 61/2517* (2013.01); *H04L 61/2535* (2013.01); *H04L 61/255* (2013.01); *H04L 67/1001* (2022.05); *H04L 69/16* (2013.01); *H04L 69/22* (2013.01); *G06F 2009/45595* (2013.01); *H04L 2101/604* (2022.05)

(58) Field of Classification Search
None
See application file for complete search history.

(56) References Cited

U.S. PATENT DOCUMENTS

| | | | |
|---|---|---|---|
| 6,061,349 A | 5/2000 | Coile et al. | |
| 6,587,866 B1 * | 7/2003 | Modi | H04L 9/40 709/240 |

(Continued)

OTHER PUBLICATIONS

USPTO. Office Action relating to U.S. Appl. No. 17/092,192, dated Jun. 30, 2023.

*Primary Examiner* — Mariela Vidal Carpio
(74) *Attorney, Agent, or Firm* — Honigman LLP; Brett A. Krueger

(57) ABSTRACT

Methods, systems, and apparatus, including computer programs encoded on a computer storage medium, for receiving a packet from a client, the packet having header information including a destination Internet Protocol (IP) address, a destination port, a source IP address, and a source port, and wherein the source IP address and source port are associated with the client; selecting a destination virtual machine based on the destination port; modifying the packet by replacing the destination IP address in the header information with an IP address of the selected destination virtual machine; and sending the modified packet to the destination virtual machine.

20 Claims, 10 Drawing Sheets

Related U.S. Application Data continuation of application No. 16/158,534, filed on Oct. 12, 2018, now Pat. No. 10,855,652, which is a continuation of application No. 15/001,471, filed on Jan. 20, 2016, now Pat. No. 10,122,681, which is a continuation of application No. 13/350,398, filed on Jan. 13, 2012, now Pat. No. 9,258,271.

(60) Provisional application No. 61/432,561, filed on Jan. 13, 2011.

(51) Int. Cl.
  *H04L 61/2521* (2022.01)
  *H04L 61/255* (2022.01)
  *H04L 67/1001* (2022.01)
  *H04L 69/16* (2022.01)
  *H04L 69/22* (2022.01)
  *H04L 101/604* (2022.01)

(56) References Cited

U.S. PATENT DOCUMENTS

| | | |
|---|---|---|
| 6,650,641 B1 | 11/2003 | Albert et al. |
| 7,039,008 B1 | 5/2006 | Howes et al. |
| 7,131,141 B1 | 10/2006 | Blewett et al. |
| 7,702,809 B1 | 4/2010 | Szabo et al. |
| 8,296,459 B1 | 10/2012 | Brandwine et al. |
| 9,419,921 B1 | 8/2016 | Anderson |
| 2002/0024959 A1 | 2/2002 | Kong |
| 2002/0103882 A1* | 8/2002 | Johnston ............ H04L 67/75 709/218 |
| 2003/0200247 A1 | 10/2003 | Banzhaf et al. |
| 2004/0044778 A1 | 3/2004 | Alkhatib et al. |
| 2004/0071128 A1* | 4/2004 | Jang ............ H04W 88/04 370/349 |
| 2004/0153858 A1 | 8/2004 | Hwang |
| 2004/0243710 A1 | 12/2004 | Mao |
| 2005/0005006 A1 | 1/2005 | Chauffour et al. |
| 2005/0185658 A1 | 8/2005 | Kamiwada et al. |
| 2005/0249199 A1 | 11/2005 | Albert et al. |
| 2005/0283826 A1 | 12/2005 | Tahan |
| 2005/0286538 A1 | 12/2005 | Oberle et al. |
| 2006/0185010 A1 | 8/2006 | Sultan |
| 2008/0107112 A1* | 5/2008 | Kuo ............ H04L 65/103 370/392 |
| 2008/0168479 A1 | 7/2008 | Purtell et al. |
| 2008/0317031 A1 | 12/2008 | Inoue |
| 2009/0034557 A1 | 2/2009 | Fluhrer et al. |
| 2009/0059940 A1 | 3/2009 | Sultan |
| 2009/0158397 A1* | 6/2009 | Herzog ............ H04L 67/303 726/4 |
| 2009/0296706 A1 | 12/2009 | Zhang et al. |
| 2010/0023582 A1 | 1/2010 | Pedersen et al. |
| 2010/0057894 A1* | 3/2010 | Glasser ............ H04L 61/4511 709/222 |
| 2010/0091665 A1 | 4/2010 | Yokoyama |
| 2010/0107162 A1 | 4/2010 | Edwards et al. |
| 2010/0115080 A1 | 5/2010 | Kageyama |
| 2010/0153802 A1* | 6/2010 | Van der Merwe ............ H04L 12/1868 714/748 |
| 2010/0226368 A1* | 9/2010 | Mack-Crane ....... H04L 12/4666 370/390 |
| 2010/0257269 A1* | 10/2010 | Clark ............ G06F 9/4856 718/1 |
| 2010/0293285 A1 | 11/2010 | Oishi et al. |
| 2010/0306763 A1 | 12/2010 | Lambert et al. |
| 2010/0332990 A1 | 12/2010 | Prahlad et al. |
| 2011/0113472 A1 | 5/2011 | Fung et al. |
| 2011/0153719 A1* | 6/2011 | Santoro ............ H04L 67/1008 709/203 |
| 2011/0296186 A1* | 12/2011 | Wong ............ H04L 63/0428 713/171 |
| 2011/0299537 A1 | 12/2011 | Saraiya et al. |
| 2011/0317554 A1 | 12/2011 | Greenberg et al. |
| 2012/0036231 A1 | 2/2012 | Thakur et al. |
| 2012/0063458 A1* | 3/2012 | Klink ............ H04L 61/2517 370/392 |
| 2012/0131662 A1* | 5/2012 | Kuik ............ G06F 21/44 718/1 |
| 2012/0144014 A1* | 6/2012 | Natham ............ H04L 67/1001 709/224 |
| 2012/0151358 A1 | 6/2012 | Joanny et al. |
| 2012/0163175 A1* | 6/2012 | Gupta ............ H04L 47/10 370/235 |
| 2012/0166690 A1* | 6/2012 | Regula ............ G06F 13/404 710/104 |
| 2012/0167085 A1* | 6/2012 | Subramaniyan ........ H04L 12/28 718/1 |
| 2012/0179796 A1 | 7/2012 | Nagaraj et al. |
| 2012/0185856 A1 | 7/2012 | Ashihara et al. |
| 2012/0317235 A1* | 12/2012 | Nguyen ............ H04L 47/15 709/219 |
| 2013/0058256 A1 | 3/2013 | Li et al. |
| 2013/0097600 A1 | 4/2013 | Cardona et al. |
| 2013/0136126 A1* | 5/2013 | Wang ............ H04L 61/103 370/392 |
| 2017/0187793 A1 | 6/2017 | Jalan et al. |

\* cited by examiner

|  | Source IP | Source Port | Dest. IP | Dest. Port |
|---|---|---|---|---|
| Client | 224.10.202.2 | 129 | 209.118.196.1 | 80 |
| Gateway | 224.10.202.2 | 129 | 10.0.0.200 | 8375 |
| Host OS | 224.10.202.2 | 129 | 10.0.0.200 | 8375 |
| VM | 224.10.202.2 | 129 | 10.0.0.200 | 8375 |

FIG. 7A

|  | Source IP | Source Port | Dest. IP | Dest. Port |
|---|---|---|---|---|
| VM | 10.0.0.200 | 3189 | 224.10.202.2 | 129 |
| Host OS | 10.0.0.200 | 8375 | 224.10.202.2 | 129 |
| Gateway | 209.118.196.1 | 8375 | 224.10.202.2 | 129 |
| Client | 209.118.196.1 | 8375 | 224.10.202.2 | 129 |

FIG. 7B

NETWORK ADDRESS TRANSLATION FOR VIRTUAL MACHINES

CROSS REFERENCE TO RELATED APPLICATIONS

This U.S. patent application is a continuation of, and claims priority under 35 U.S.C. § 120 from, U.S. patent application Ser. No. 17/092,192, filed on Nov. 6, 2020, which is a continuation of U.S. patent application Ser. No. 16/158,534, now U.S. Pat. No. 10,855,652, filed on Oct. 12, 2018, which is a continuation of U.S. application Ser. No. 15/001,471, now U.S. Pat. No. 10,122,681, filed on Jan. 20, 2016, which is a continuation of U.S. application Ser. No. 13/350,398, now U.S. Pat. No. 9,258,271, filed on Jan. 13, 2012, which claims the benefit of U.S. Provisional Application No. 61/432,561, filed on Jan. 13, 2011. The disclosures of these prior applications are considered part of the disclosure of this application and are hereby incorporated by reference in their entireties.

TECHNICAL FIELD

This specification relates to network address translation, and more specifically to network address translation for virtual machines.

BACKGROUND

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

In general, one aspect of the subject matter described in this specification can be embodied in methods that include the actions of receiving a packet from a client, the packet having header information including a destination Internet Protocol (IP) address, a destination port, a source IP address, and a source port, and wherein the source IP address and source port are associated with the client; selecting a destination virtual machine based on the destination port; modifying the packet by replacing the destination IP address in the header information with an IP address of the selected destination virtual machine; and sending the modified packet to the destination virtual machine. Other embodiments of this aspect include corresponding systems, apparatus, and computer programs.

These and other aspects can optionally include one or more of the following features. The destination virtual machine can be associated with a plurality of port numbers and wherein selecting the destination virtual machine includes determining that the destination port is in the plurality of port numbers. The destination port can indicate that the destination virtual machine should be selected using a load balancing scheme and wherein the destination virtual machine is selected using the load balancing scheme. Selecting the destination virtual machine further includes converting the destination port using a transformation and selecting the destination virtual machine based on the transformed destination port. The packet can be modified by replacing the destination port in the header information with a different port. Replacing the destination port can be performed by a host operating system that hosts the destination virtual machine. Sending the modified packet to the destination virtual machine can include sending the modified packet to the destination virtual machine using a virtual network pair. The packet can be a layer 2 or a layer 3 packet. The packet can be part of a transmission control protocol (TCP) connection between the client and the destination virtual machine. The host operating system that hosts the destination virtual machine can maintain an end point of the TCP connection.

Particular embodiments of the subject matter described in this specification can be implemented so as to realize one or more of the following advantages. In order to enable fault tolerance and improve the overall performance of the system, the port mapping portion of network address translation is performed by individual host machines rather than by gateways. This reduces complexity in the network address translation gateways. Because network address translation tables in gateways are smaller due to not having to maintain port mapping information, the tables can be more easily replicated and synchronized across a large number of gateways. Port mapping can be performed in a user process space of an operating system in order to prevent malfunctions of the port mapping process from impacting the operating system's kernel. A port mapping processing can provide port mapping services for plurality of virtual machines. If a virtual machine becomes disabled, the port mapping services for the other virtual machines will not be impacted.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 7A illustrates an example network address translation performed by a gateway and by a host operating system on a packet originating from a client.

FIG. 7B illustrates an example network address translation performed by a gateway and by a host operating system on a packet originating from a virtual machine.

Like reference numbers and designations in the various drawings indicate like elements.

DETAILED DESCRIPTION

Figure 1:
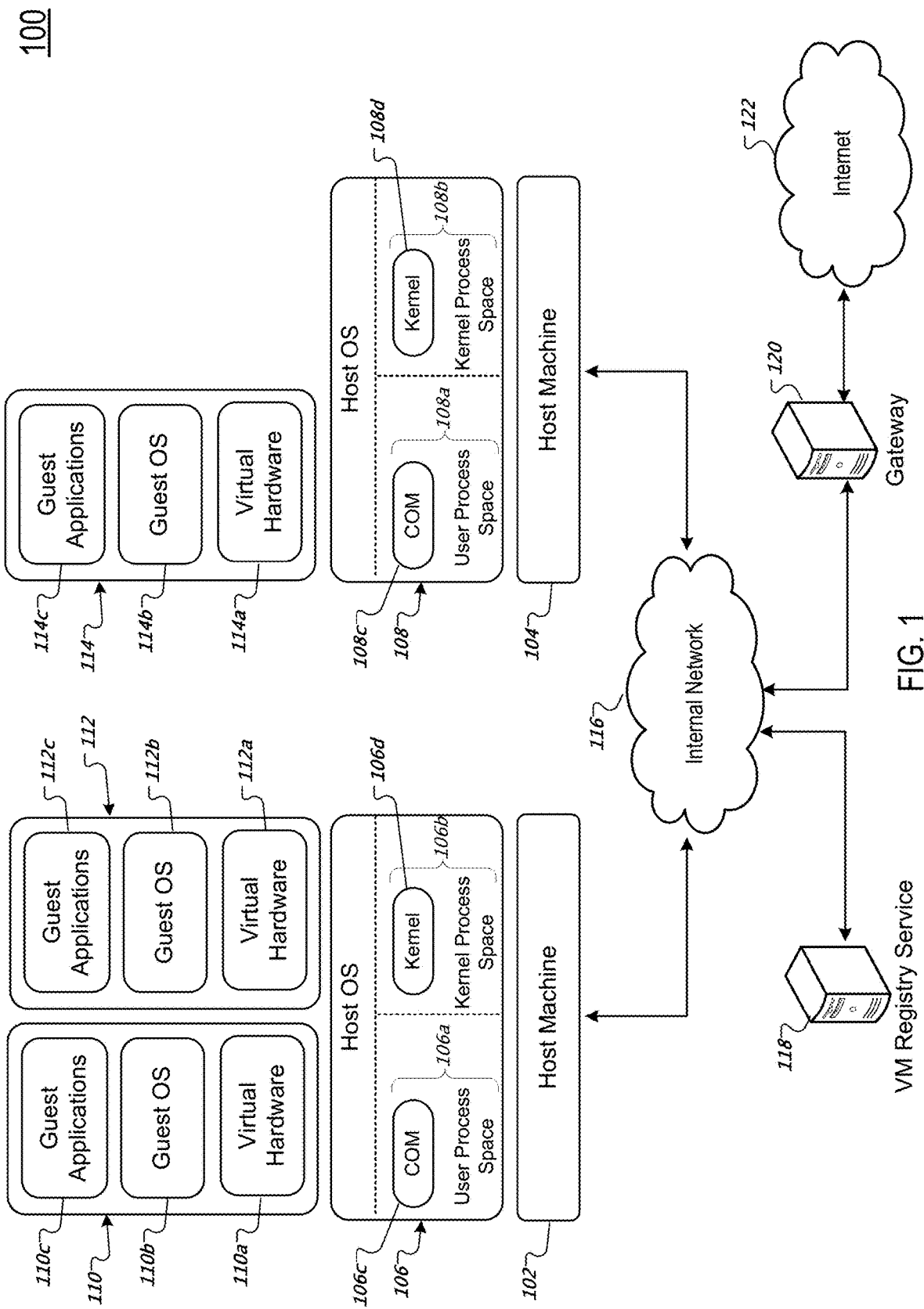
FIG. 1 is a schematic illustration of an example system that provides virtual network connectivity between virtual machines.

FIG. 1 is a schematic illustration of an example virtual machine system 100. The system 100 includes one or more host machines such as, for example, host machine 102 and host machine 104. Generally speaking, a host machine is one or more data processing apparatuses such as rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines. For example, the host operating system 106 is managing virtual machine (VM) 110 and VM 112, while host operating system 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. If guest software executing in a VM, or the VM itself, malfunctions or aborts, other VMs executing on the host machine will not be affected. In some implementations, a single virtual machine can also have its execution distributed over multiple physical machines. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space. The communication process communicates with a VM registry service (e.g., VM registry service 118) in order to establish a virtual network pair (VNP) between two VMs. A virtual network pair (VNP) is a logical computer network that is implemented on top of one or more physical (wired or wireless) computer networks. A VNP routes traffic between two endpoints using one or more virtual connections or links. By way of illustration, a VNP between virtual machine 110 and virtual machine 114 would route packets sent between VNP endpoints managed respectively by communication processes 106c and 108c over internal network 116. The VM registry service 118 is one or more data processing apparatus that execute software for keeping track of assignments of network addresses (e.g., IP addresses) to VMs, and for keeping track of network addresses (e.g., IP addresses) of host machines that the VMs are executing on. The data processing apparatus can be in different locations and can have different capabilities and computer architectures.

Figure 2:
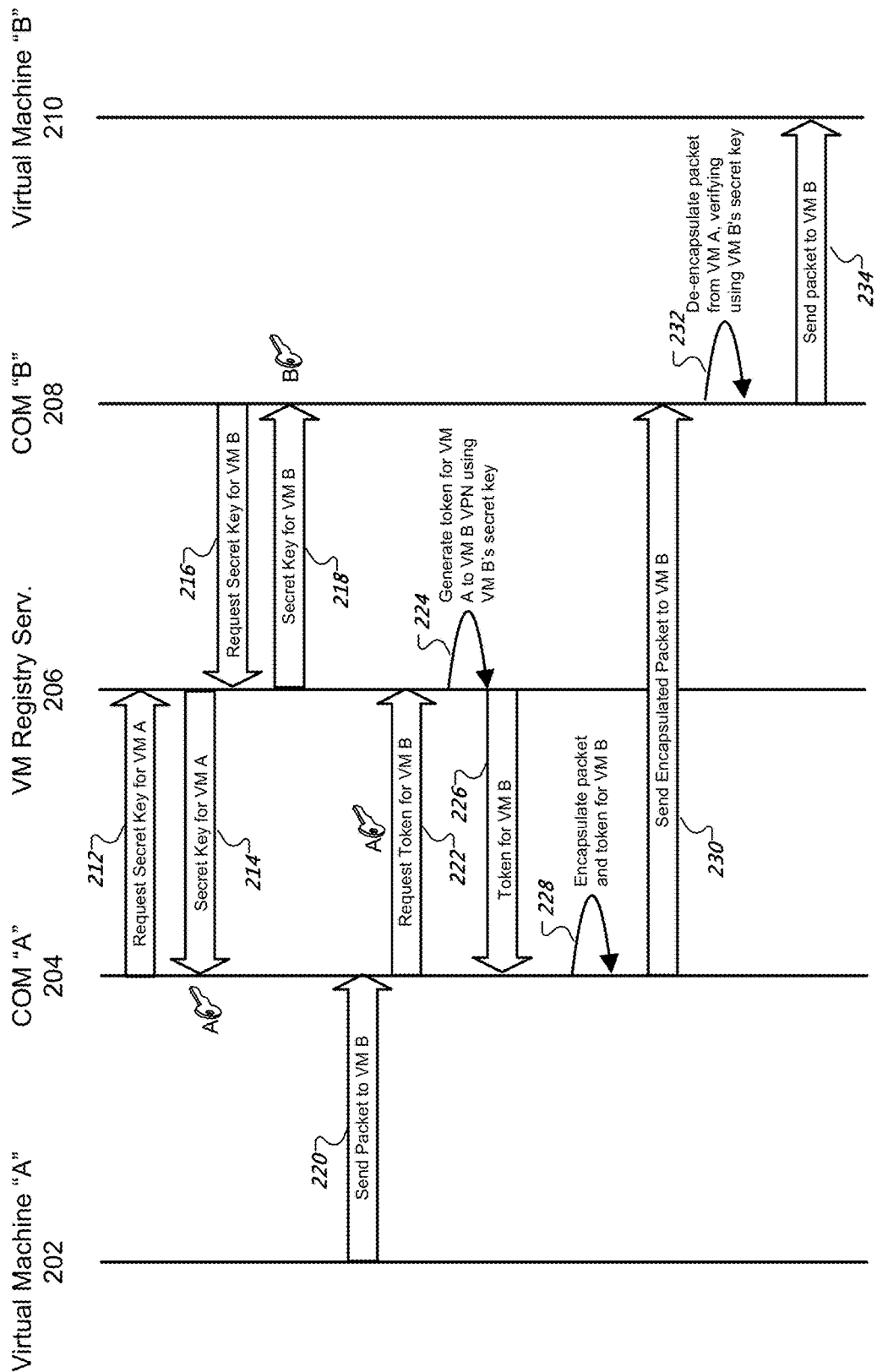
FIG. 2 is a diagram illustrating example token negotiation and message sending.

FIG. 2 is a diagram illustrating example token negotiation and message sending. Before a VM can send packets to or receive packets from other VMs, the VM (or a communication process executing on the VM's host machine) needs to obtain a secret key. A secret key is a piece of information that serves to uniquely identify a VM among all VMs connected through their respective host machines to the internal network 116, for example. The secret key can be a number, a string of characters, other data, combinations of these, or any other string of bits of sufficient entropy. The secret key can be generated in such a way that an entity with no prior knowledge of the key has no computationally feasible way of deriving the key. The secret key can be generated using, for example, a cryptographically secure pseudorandom number generator. In some implementations, the secret key is assigned to a VM by the VM registry service 118. Secret keys can also be assigned by another process besides the VM registry service. A given VM may not know what its secret key is and does not know the secret key of other VMs. In some implementations, the communication process (e.g., communication process 106c) on a given host machine (e.g., host machine 102) keeps track of the secret keys for VMs managed by the host operating system (e.g. host operating system 106).

By way of illustration, the communication process 204 on VM A 202's host machine can request a secret key for VM A 202 from the VM registry service 206 by sending a message 212 to the VM registry service 206. The request for the secret key can be sent via secure protocol that allows the VM registry service 206 to authenticate which communication process it is communicating with. Other communications between the VM registry service and communication process 204 or other communication processes can also use the same secure protocol.

The VM registry service 206 responds to the communication process 204 with a message 214 containing the secret key for VM A. As a further example, the communication process 208 on VM B 210's host machine can request a secret key for VM B 210 from the VM registry service 206 by sending a message 216 to the VM registry service 206. The VM registry service 206 responds to the communication process 208 with a message 218 containing the secret key for VM B.

Before an initial packet from one VM to another is transmitted, a VNP between the two VMs is established. In various implementations, the communication process on a given host machine is responsible for establishing VNPs. For example, communication process 106c is responsible for establishing VNPs for VM 110 and VM 112. Likewise, communication process 108c can do the same for VM 114. Each VM can communicate with one or more other VMs using a separate VNP for each. Referring again to FIG. 2 and by way of example, VM A 202 attempts to transmit a packet 220 to VM B 210. In some implementations, the packet is an IP version 4 or version 6 packet. In other implementations, the packet is an Open Systems Interconnection Reference Model layer 3 or higher protocol packet, such as, for example, UDP, Transmission Control Protocol (TCP), and so on. Other types of packets are possible including, for example, Ethernet packets. The packet is intercepted by the communication process 204 of the host operating system on which VM A 202 is executing. The communication process 204 determines that a VNP between VM A 202 and VM B 210 has not yet been established. This being the case, the communication process 204 requests a token to be used to communicate with VM B 210 from the VM registry service 206. A token is required in order to establish a unidirectional VNP from a source VM to a destination VM. The token request 222 can contain the secret key for VM A and a network address of the destination VM B 210, for example.

In response to the request 222, the VM registry service 206 uses the secret key S_a of VM A 202 to look up or determine the following attributes of VM A 202:

IP_VM_a, the IP address assigned to VM A;
Phys_Port_a, the UDP port assigned to VM A on VM A's host machine;
Phys_IP_a, the IP address of VM A's host machine; and
expiry_a_b, the validity period of the token which, in some implementations, is the current time plus a time-to-live (TTL). The TTL can be on the order of minutes (e.g., 10 minutes) or other granularities. In some implementations, expiry_a_b is set to a value (e.g., −1) to indicate that the token never expires.

In some implementations, the VM registry service 206 verifies that the request 222 was actually transmitted from Phys_IP_a and otherwise denies the request. In further implementations, the VM registry service 206 can consult a traffic policy to determine if VM A 202 should be allowed to communicated with VM B 210 and, if not, denies the request.

In various implementations, the VM registry service 206 computes the token T_a_b for traffic from VM A 202 to VM B 210 as follows (FIG. 2 at 224):

T_a_b=TruncMAC (S_b, Phys_IP_a|Phys_IP_b|Phys_Port_a|Phys_Port_b|IP_VM_a|IP_VM_b|expiry_a_b)

Where '|' denotes concatenation, S_b is VM B 210's secret key, and TruncMAC is a Message Authentication Code (MAC) function (e.g., HMAC-SHA1, or TBD) that has been truncated, for example, to 64 bits. Other MAC functions are possible. In some implementations, all of the fields being concatenated are fixed size, i.e., the concatenation is uniquely determined without the need for separators. Although the fields are concatenated in a certain order, other field orderings are possible.

Generally speaking, a secret key ties a host machine addressing scheme (e.g., Phys_IP, Phys_Port) to a VNP addressing scheme (IP_VM). In other implementations, Phys_IP, Phys_Port) could be some other host addressing scheme, like remote direct memory access (RDMA), for instance. Similarly, (IP_VM) could easily be translated to some other VPN addressing scheme, like the virtual hardware address (e.g., media access control address) of a given VM.

The VM registry service 206 returns the tuple (Phys_IP_b, Phys_Port_b, T_a_b, expiry_a_b) to communication process 204 in a response 226 to the request 222, where Phys_IP_b is the IP address of the host machine on which VM B 210 is executing and Phys_Port_b is the UDP port on VM B's host machine that has been reserved for receiving traffic directed to VM B 210. Once the communication process 204 receives the tuple, the packet 220 can be encapsulated and transmitted to VM B's host machine using the Phys_IP_b and Phys_Port_b as the destination address of the packet. Future packets destined for VM B 210 can reuse the tuple information until expiry_a_b has passed. Once the expiry_a_b has passed (if it is not set to a value indicating that the token never expires), a new token can be obtained as described above, for example. In order for VM B 210 to send packet to VM A 202, a token is needed to establish a unidirectional VNP from VM B 210 to VM A 202. The same process can be followed as outlined above or, alternatively, a packet sent from VM A to VM B can include the token. This alternative is described further below.

Figure 3:
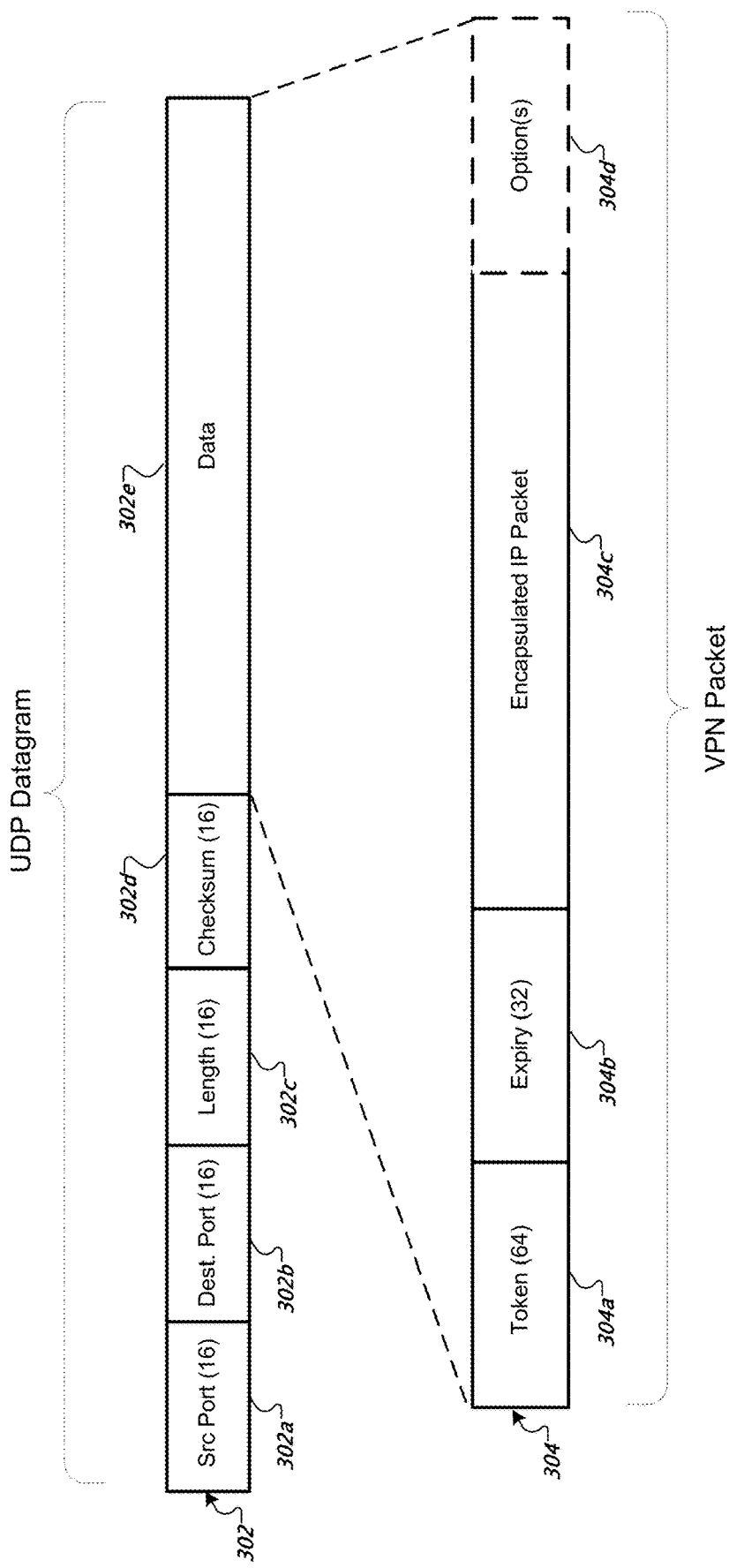
FIG. 3 is a diagram of an example encapsulation packet.

Outgoing packets (e.g., outgoing packet 220) such as IPv4 and IPv6 packets are encapsulated by the communication process, or another process, using the obtained token. Encapsulation of an outgoing packet takes place before packet transmittal. In some implementations, the encapsulation packet is a UDP datagram. Other types of encapsulation packets are possible. By way of illustration, an outgoing packet is encapsulated in the data portion 302e of a UDP packet 302 as shown in FIG. 3. The UDP packet 302 has a header consisting of a source port number 302a (16 bits), a destination port number 302b (16 bits), a length field 302c (16 bits) which is the length of the data portion 302e, and a checksum 302d (16 bits). In various implementations, the source port 302a is set to Phys_Port_a and the destination port 302b is set to Phys_Port_b. The data portion 302e is variable length and contains the outgoing packet. In some implementations, the data portion 302e can be encrypted. Symmetric or asymmetric encryption key algorithms can be used to encrypt some or all of the data portion 302e, for example. The encryption keys can be distributed by a VM registry service, e.g., VM registry service 118 of FIG. 1. In some implementations, a conventional key negotiation protocol, e.g., the Diffie-Hellman protocol, is used to encrypt the data portion 302e. The data portion 302e contains VNP packet 304 that includes the token T_a_b 304a (64 bits), the expiry time expiry a_b 304b (32 bits), the outgoing packet 304c (variable length), and an optional options field 304d (variable length). Other lengths for the VNP packet fields are possible. In addition, the fields of the VNP packet 304 can occur in a different order than that which is illustrated in FIG. 3. As described above, the outgoing packet can be, for instance, an OSI Reference Model layer 2 or higher protocol packet. In some implementations, the outgoing packet is an IP packet. Other outgoing packet types are possible including, for example, Ethernet packets. Once encapsulation is complete, the communication process or another process on the respective host machine's operating system can transmit the UDP packet 302 in an IP packet with a source IP address of Phys_IP_a and a destination IP address of Phys_IP_b. Alternatively, the encapsulation packet can be transmitted using a different protocol.

In some implementations, the VNP packet includes an options field 304d. The options field 304d allows a sending VM to convey additional information to a receiving VM. If the encapsulation packet is a UDP packet, as illustrated in FIG. 3, the length of the options field can be calculated based on the difference of the value specified in the length 302c field and the combined size of the token 304a, expiry 304b, and encapsulated IP packet 304c fields. The size of the encapsulated IP packet 304c is available in the header of the packet 304c. The options field 304d can be omitted from the VNP packet 304 if its inclusion would push the size of the encapsulation packet (e.g., UDP packet 302) above the maximum transmission unit (MTU) which would result in packet fragmentation. In further implementations a field such as a bit flag, for example, can be added to the VNP packet 304 to indicate the presence of an options field 304d.

The options field 304d can be used to send a return VNP token T_b_a to the receiving VM in order to avoid the receiving VM having to obtain a token in order to reply to the sending VM. The communication process 204 for VM A 202 has all information on hand that is needed to compute T_b_a; in particular, the token is signed with VM A 202's secret key S_a. The return token T_b_a can likely be included in the first packet sent between VM A 202 and VM B 210 since, in the case of TCP, the first packet is a small SYN packet which leaves sufficient room for the options field 304d containing the return token without the resulting encapsulation packet exceeding MTU. The options field 504d can also be used to send various protocol extensions, to exchange encryption keys, to send control flow information, and so on.

Returning to FIG. 2, the encapsulation packet is then sent 230 to the destination host machine for VM B 210 where it is intercepted by the communication process 208 (or by another process). The communication process 208 de-encapsulates the received message (FIG. 2 at 232) and then delivers the original packet to the VM B 210. This can be done by injecting the IP packet into the network stack as an Ethernet frame, for example.

Figure 4:
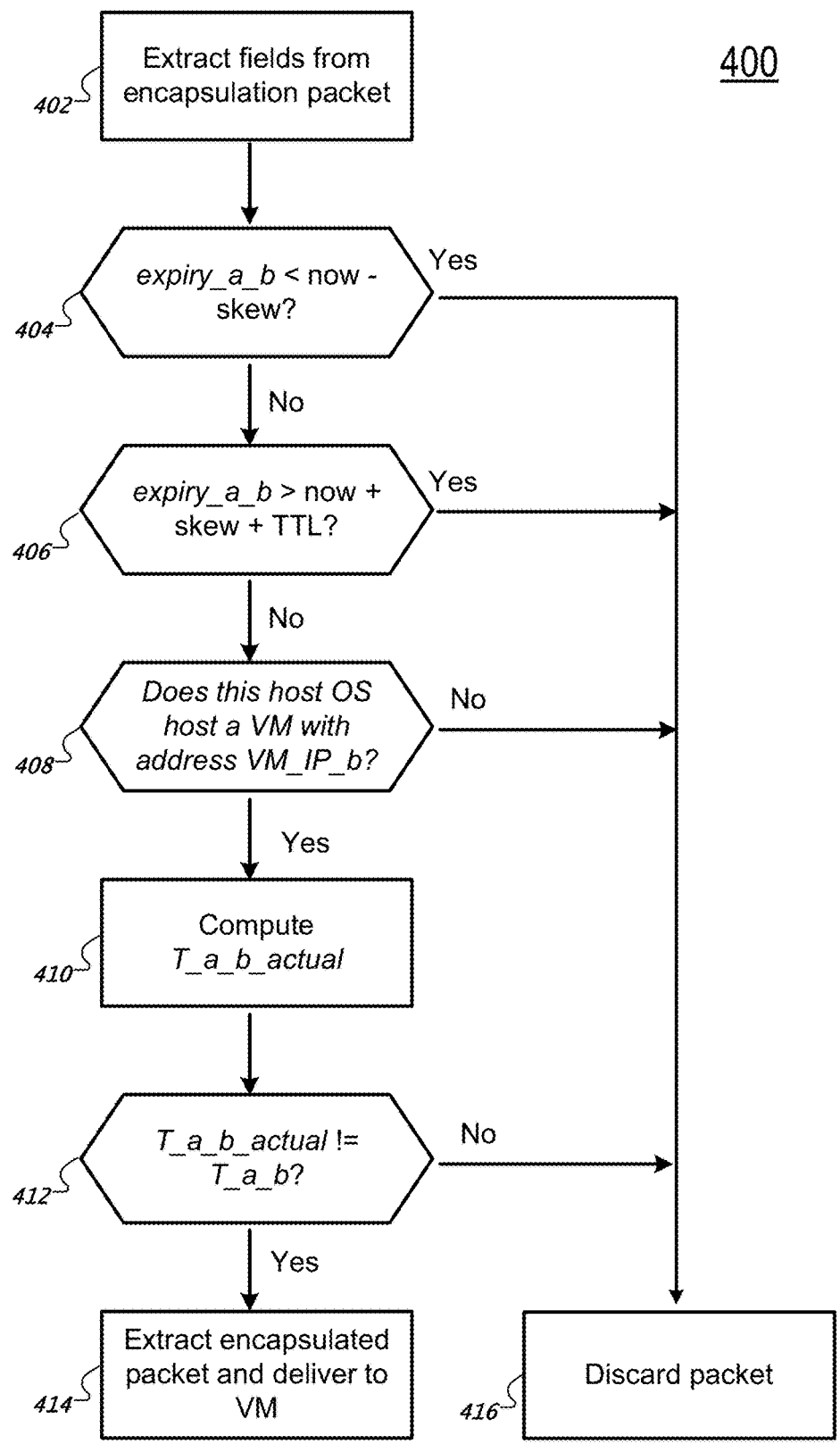
FIG. 4 is a flow diagram illustrating an example technique for packet de-encapsulation.

FIG. 4 is a flow diagram illustrating an example technique 400 for packet de-encapsulation as can be performed by the communication process 208 or another process on the destination host machine. The de-encapsulation process can be performed without the need to communicate with the VM registry service 118. With reference to FIG. 2, when an encapsulation packet is received fields from the packet are extracted in order to validate the packet (step 402). The source and destination IP addresses and ports of the UDP packet are extracted: Phys_IP_a, Phys_IP_b, Phys_Port_a, and Phys_Port_b. The source and destination address of the encapsulated IP datagram are also extracted: IP_VM_a, IP_VM_b. Finally, the token and expiry are extracted from the encapsulation header: T_a_b and expiry_a_b.

If expiry_a_b is less than the current time minus a skew (step 404), the encapsulation packet is discarded (step 416). In some implementations, the skew is an estimate of likely clock skew between host machine clocks (e.g., a few seconds). The skew can be set to zero if host machine clocks are synchronized. Otherwise, if expiry_a_b is greater than the current time plus skew and TTL (step 406), the encapsulation packet is also discarded (step 416). A check is performed to verify whether the host operating system is hosting a VM having the address VM_IP_b (step 408). If not, the encapsulation packet is discarded (step 416). The extracted fields and VM B 210's secret key S¬_b are used to calculate T_a_b_actual as follows (step 410): T_a_b_actual=TruncMAC(S_b, Phys_IP_a|Phys_IP_b-|Phys_Port_a|Phys_Port_b|IP_VM_a|IP_VM_b|expiry_a_b).

T_a_b_actual is then compared to the token T_a_b from the encapsulation packet (step 412). If T_a_b_actual is the same as T_a_b then the encapsulated packet (e.g., encapsulated IP packet 304c) is extracted from the encapsulation packet (e.g., encapsulation packet 302) and is delivered to VM B 210 (step 414). Otherwise, the encapsulation packet is discarded (step 416).

In further implementations, and with reference to FIG. 1, the gateway 120 can serve as an encapsulation gateway to allow virtual machines on the internal network 116 to communicate with hosts on the external network 122. When the gateway 120 receives an encapsulated packet from a VM (e.g., VM 114) destined for the external network 122, the gateway 120 will validate the token of the VNP packet as described above with reference to FIG. 4, for example. If the token validation fails, the packet is discarded. If validation succeeds, the encapsulation packet is de-encapsulated and the encapsulated packet is extracted and injected into the gateway 120's network stack where it is subject to normal routing. Upon receiving a non-encapsulated packet from the external network 122 destined for a VM, the gateway 120 obtains a token (e.g., from the VM registry service 118 or from a local cache of tokens) for the destination of the packet and then encapsulates the packet as described above with reference to FIG. 2, for example. The gateway 120 then transmits the encapsulated packet to the destination VM's host machine. If a VM queries the VM registry service 118 for a token that is for a destination computer that is not on the internal network 116, the VM registry service 118 responds with a tuple (Phys_IP_b, Phys_Port_b, T_a_b, expiry_a_b) where Phys_IP_b, Phys_Port_b and T_a_b are for the gateway 120, rather than the ultimate destination, so that the VM's packets are routed through, and de-encapsulated by, the gateway 120. In some implementations, the VM can use this tuple to send packets to any destination on the external network 122 thus avoiding having to obtain a tuple from the VM registry service 118 for each unique destination.

Figure 5:
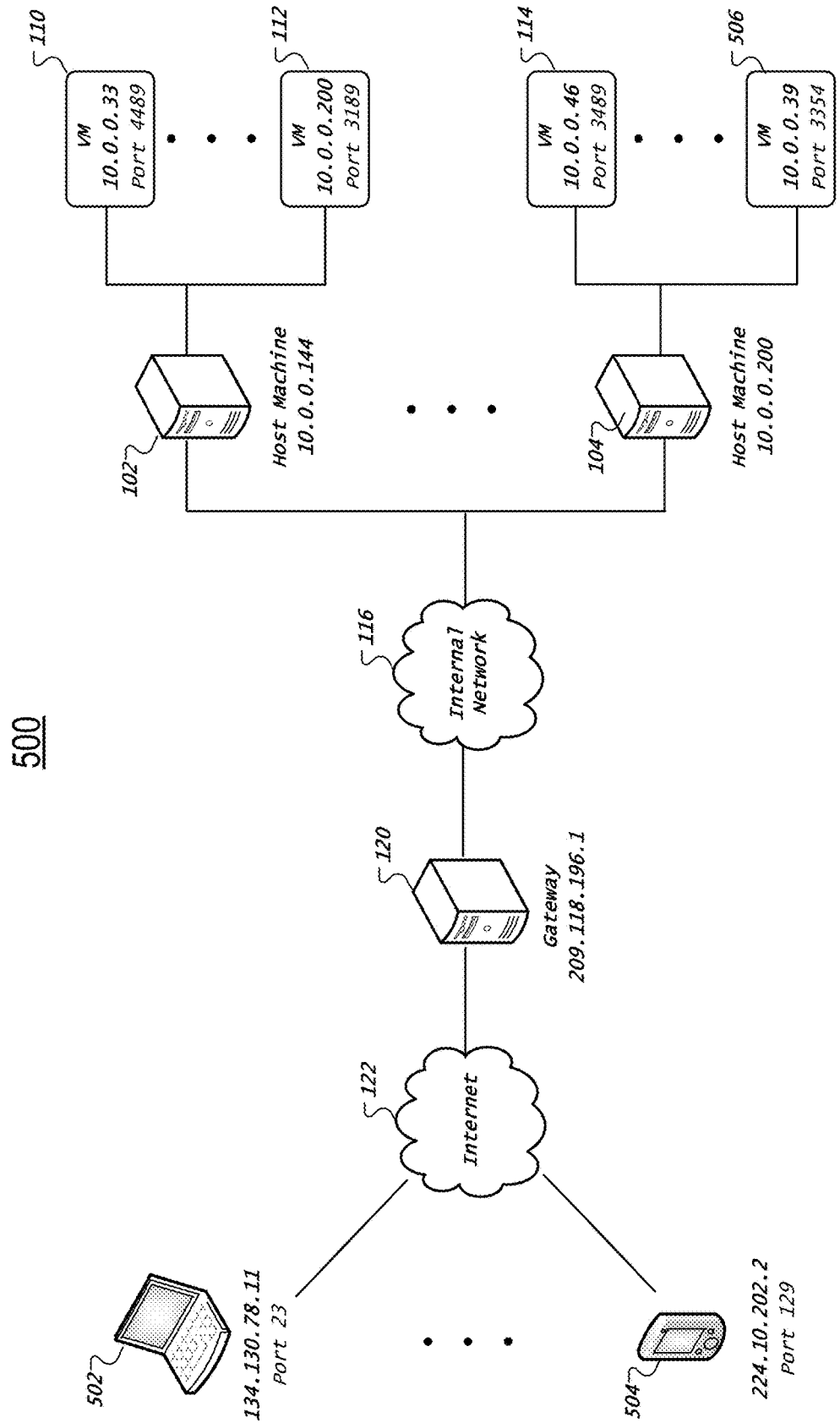
FIG. 5 is a schematic illustration of an example system that provides network address and port translation.

FIG. 5 is a schematic illustration of an example system 500 that provides network address and port translation. The system 500 includes an external network 122, such as the Internet or another network, through which clients (e.g., clients 502 and 504) can communicate with the gateway 120. A client is a data processing apparatus such as, for example, a server, a personal computer, a laptop computer, a smart phone, a tablet computer, or another device. The gateway 120 routes traffic between the external network 122 and the internal network 116 by changing source or destination address information in packet headers so that the address space of the internal network 116 is hidden behind the IP address of the gateway 120. In particular, packets arriving at the gateway 120 from the external network 122 and bound for the internal network 116 have their IP datagram destination address changed from that of the gateway 120 (e.g., 209.118.196.1) to the IP address of a VM (e.g., 10.0.0.46). Packets arriving at the gateway from the internal network 116 and bound for the external network 122 have their IP source address changed from that of a VM (e.g., 10.0.0.46) to an external address routed to the gateway 120 on the external network 122 (e.g., 209.118.196.1). IP address mapping is described further below.

The internal network includes one or more sub-networks and allows the gateway 120 to communicate with host machines (e.g., host machines 102 and 104). Although only two host machines are shown in FIG. 5, the internal network 116 can include hundreds or thousands of host machines in one or more geographic locations. Each host machine's network interface is bound to a IP address on the internal network 116: host machine 102 is bound to IP address 10.0.0.144, for example, and host machine 104 is bound to IP address 10.0.0.200. Each host machine hosts one or more virtual machines. Host machine 102 hosts VM 110 and VM 112, for instance, and host machine 104 hosts VM 114 and VM 506. A virtual machine has a virtual network interface which is also bound to a IP address on the internal network 116. For instance, VM 110 is bound to IP address 10.0.0.33, VM 112 is bound to IP address 10.0.0.200, VM 114 is bound to IP address 10.0.0.46, and VM 506 is bound to IP address 10.0.0.39.

Figure 6:
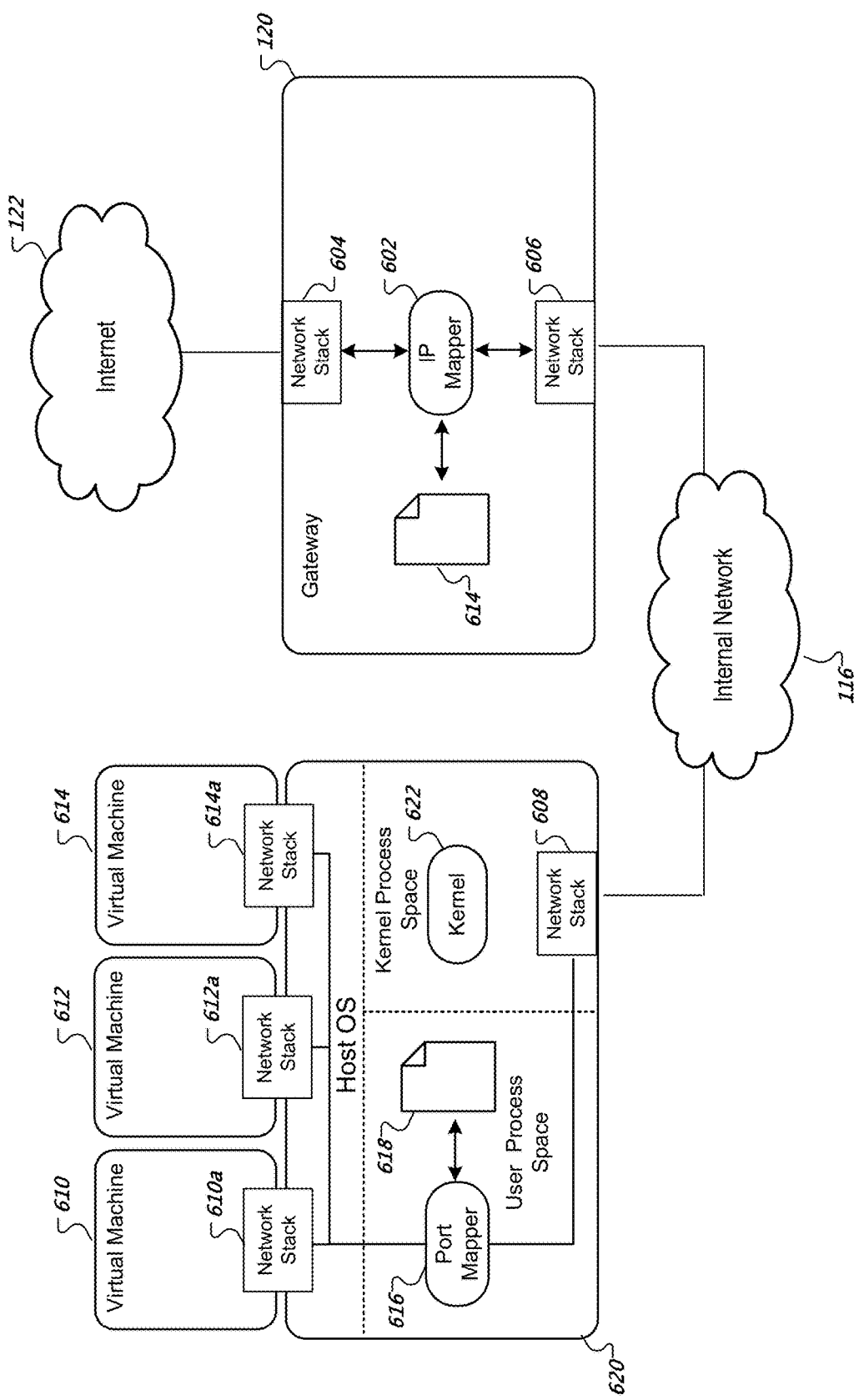
FIG. 6 is a schematic illustration of example network address translation components.

With reference to FIG. 6, the gateway 120 includes one or more software or firmware components that implement an IP mapper 602 process. Generally speaking, the IP mapper 602 receives packets from one or more network protocol stacks (or "network stacks"), modifies IP header information in the packets, and transmits the packets using one or more different protocol stacks after modifying address information in the packet headers. A network stack is software or firmware that implements one or more network protocols (e.g., Ethernet, IP, UDP, TCP), the bottommost of which communicates with a network interface to transmit and receive packets using a communication medium such as Ethernet or WI-FI. A network stack can implement one or more layers of the Open Systems Interconnection model, for example.

Network stack 604 is used by the gateway 120 to send and receive packets to and from the external network 122. Likewise, network stack 606 is used by the gateway 120 to send and receive packets to and from the internal network 116. When a packet is received from the network stack 606, i.e., from the internal network 116, bound for the external network 122, the source IP address (SIP) of the packet is replaced by an external address routed to the gateway 120 on the external network 122 (e.g., 209.118.196.1). In some implementations, packets from a VM to the gateway 120 are sent over a VNP as encapsulated packets (as described above).

When a packet is received from the network stack 604, i.e., from the external network 122, the destination IP address (DIP) and destination port (DP) of the packet is examined by the IP mapper 602 to determine which VM (e.g., VM 110, 112, 114 or 506) the packet will be forwarded to. The IP address of the selected VM is put in place of the DIP of the packet and the packet is sent to the network stack 606 where it will transmitted to the selected VM over the internal network 116. In some implementations, the packet is sent to the VM in an encapsulated packet using a VNP (as described above).

In some implementations, each VM is associated with a set or range of port numbers and the VM selected to forward the packet to is the VM which is associated with the DP. For example, if the DP is 5389, then the VM associated with port range 5000-5999 would be selected. In other implementations, a particular DP indicates that a VM should be selected using a load balancing scheme. For instance, if DP of a packet is 80, then a VM would be selected in a round-robin fashion. Other load balancing schemes are possible. In yet further implementations, the VM is selected based on a transformation of the DP. The DP can be provided to a function that converts the DP to a number which can be used to select a VM. By way of illustration, if the DP=2022, then the VM assigned to port 22 is selected. (VM port assignment is described further below.) If the DP=2023, then the VM assigned to port 23 is selected, and so on.

An association is created between the IP address for the selected VM, the source IP address (SIP) of the packet, the source port (SP) of the packet, and the DP of the packet. In some implementations, the association is stored in table 614. When new packets are received, the IP mapper 602 checks the table to determine if the combination of SIP, SP and DP is associated with an IP address for a VM. The IP address of the selected VM is put in place of the destination IP address (DIP) of the packet and the packet is sent to the network stack 606 where it will transmitted to the selected VM over the internal network 116.

A network stack 608 of host operating system 620 executing on a host machine (e.g., host machine 102) is used by the host operating system 620 to send and receive packets to and from the internal network 116. When a packet is received from the network stack 608, i.e., from the internal network 116, the packet is de-encapsulated and delivered to the appropriate VM associated with the destination port of the encapsulation packet (see FIG. 4 above). By way of illustration, if a packet received from the network stack 608 is destined for the VM 612, the packet is provided to either the virtual network interface of the VM 612 or injected into the network stack 612*a*. Either of these actions will cause the packet to be delivered to the VM 612. In some implementations, the destination port of the packet received from the network stack 608 is changed by a process executing in the host operating system (e.g., in the user process space or in the kernel process space) to a port that the destination VM expects.

Packets can be received from the virtual network interface or the network stack of a VM. The SP of these received packets is assigned by the guest operating system of the respective VM. In some implementations, if the packet is bound for the external network 122 a port mapper process 616 of the host operating system replaces the SP in the packet with a new port that is visible on the external network 122 before sending the packet using the network stack 608. The new port can be selected from a range of port numbers assigned to the VM, for example. Other ways of selecting the new port are possible. The port mapper 616 creates an association between the new port, the DIP of the packet, and the DP of the packet. In some implementations, the association is stored in table 618. When a new packet bound for the external network 122 is received from a VM network stack (e.g., network stack 610*a*, 612*a* or 614*a*), the port mapper 616 looks first to see if there is an association stored in the table 618 for the DIP and DP of the packet. If so, the port stored in the table 618 replaces the SP of the packet before the packet is sent using the network stack 608. If not, a new port is selected as (described above) to replace the SP before the packet is sent using the network stack 608. The table 618 can also be used for packets received on internal network 116 via host network stack 608 from the gateway network stack 606.

The port mapper process can reside in the user process space or the kernel process space of the host operating system 620. If the port mapper process resides in the user process space its malfunction will not cause the host operating system kernel 622 or network stack 608 to fail. Alternatively, the port mapper process and the table 618 can reside in the process space of each VM (e.g., VM 610, 612 and 614). In further implementations, the port mapper process can reside in a VM network stack (e.g., network stack 610*a*, 612*a* and 614*a*) or in the host operating system network stack 608.

Because the gateway table 614 does not need to contain port mapping information, the table itself is smaller than it would be otherwise. The small size of the table 614 can make the table easier to replicate and synchronize across multiple gateway machines. In further implementations, a gateway's externally facing IP address (e.g., 209.11.196.1) can be advertised to clients using anycast. Anycast is a network addressing and routing technique in which packets from a client (e.g., client 224.10.202.2) are routed to the topologically nearest gateway in a group of potential gateways all identified by the same externally facing IP address. Anycast is usually implemented by using Border Gateway Protocol (BGP) to simultaneously announce the same destination IP address range from many different places on the Internet. The use of anycast along with replication of table 614 means that any gateway can route a packet to the same VM if the association of the VM's IP address with the SIP and SP of the packet is in the table 614. This improves reliability since if a gateway becomes unavailable to a client, another gateway advertising the same IP address can route packets from the same client to the same VM. Moreover, if a connection based protocol such as TCP, for instance, is used to communicate between a client and a VM, the connection can be maintained since packets from the client will go to the same VM regardless of which gateway they pass through.

FIG. 7A illustrates network address translation performed by a gateway and by a host operating system for a packet flowing from a client 504 on the external network 122 to a VM 112 on the internal network 116. Client 504 sends a packet to the gateway 120 having a SIP=224.10.202.2, SP=129, DIP=209.118.196.1, and DP=80. The gateway changes the DIP in the packet header to the internal IP address of VM 112 (i.e., 10.0.0.200) and changes the DP to 8375. A host operating system of the host machine 10.0.0.144 receives the packet from the gateway 120 through a VNP by way of its network stack, for example, and delivers the packet having the modified DP to the VM 122 by way of VM 122's network stack. In some implementations, the port mapper process (e.g., port mapper 616) instead of the gateway 120 changes DP to a port expected by the destination VM (e.g., DP=80).

FIG. 7B illustrates network address translation performed by a gateway and by a host operating system for a packet flowing from VM 112 on internal network 116 to a client 504 on the external network 122. The VM 122 sends the packet using its network stack and the packet is intercepted by the host machine 102's host operating system. The packet has SIP=10.0.0.200, SP=3189, DIP=224.10.202.2, and DP=129. The host operating system's port mapper process (e.g., port mapper 616) changes the SP in the packet to 8375 and then sends the modified packet to the gateway 120 using its network stack and, optionally, a VNP. The gateway 120 receives the packet from the host operating system and changes the SIP address to be that of its own, i.e., 209.118.196.1. The modified packet is then transmitted to the client 504. In this way, internal network 116 IP addresses and ports are hidden from clients.

Figure 8:
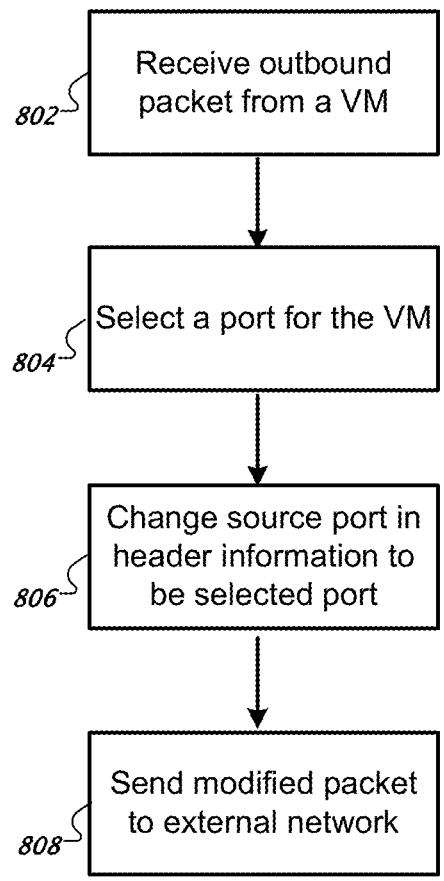
FIG. 8 is a flow chart of an example technique for port mapping.

FIG. 8 is a flow chart of an example technique for port mapping as can be implemented by a data processing apparatus, for example. An outbound packet from a virtual machine executing on the data processing apparatus is received (e.g., by the port mapper 616; step 802). The packet has header information including a destination IP address, a destination port, a source IP address, and a source port. The source IP address and source port are associated with the virtual machine. A different port from the source port is selected (e.g., by the port mapper 616) from a plurality of ports associated with the virtual machine (step 804) or from a previously stored association (e.g., from table 618). The source port in the header information is changed to the selected port (step 806). The modified packet is then sent to an external network (e.g., external network 122) by way of a gateway (e.g., gateway 120) that is configured to change the source IP address of the packet to an IP address of the gateway before routing the packet to its destination (step 808).

Figure 9:
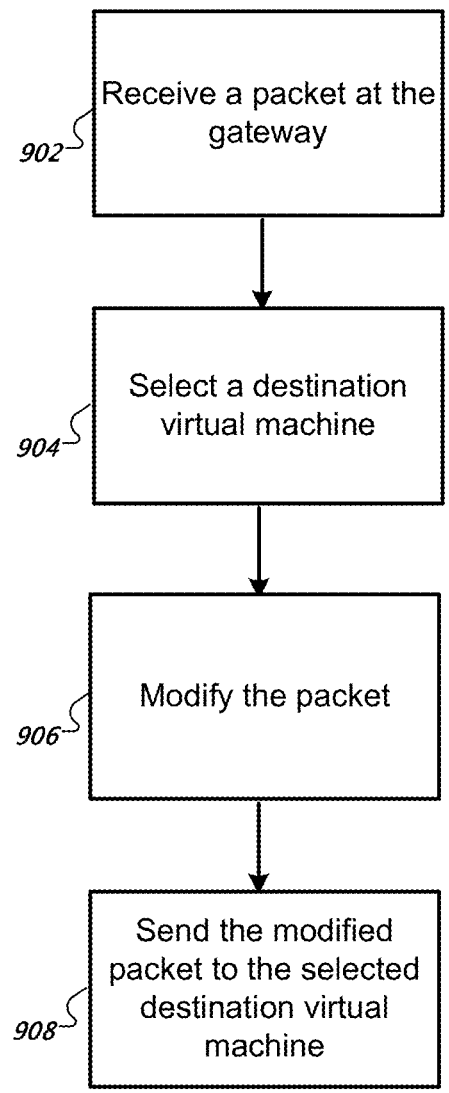
FIG. 9 is a flow chart of an example technique for receiving packets at a gateway.

FIG. 9 is a flow chart of an example technique 900 for receiving packets at a gateway. A packet is received from a client (e.g., client 502), the packet having header information including a destination Internet Protocol (IP) address, a destination port, a source IP address, and a source port, and wherein the source IP address and source port are associated with the client (step 902). A destination virtual machine (e.g., virtual machine 112) is selected based on the destination port (step 904). The packet is modified by replacing the destination IP address in the header information with an IP address of the selected destination virtual machine (step 906). The modified packet is then sent to the destination virtual machine (step 908).

FIG. 9 is a flow chart of an example technique for receiving packets from different gateways as can be implemented by a data processing apparatus, for example. A first packet is received from a client (e.g., client 502) by way of a first gateway (step 902). The first packet has header information with a destination IP address of a virtual machine (e.g., virtual machine 114) executing on the data processing apparatus. In some implementations, the destination IP address is not visible to the client. A different second packet is received from the client by way of a different, second gateway (step 904). The second packet also has header information with a destination IP address of the virtual machine.

Figure 10:
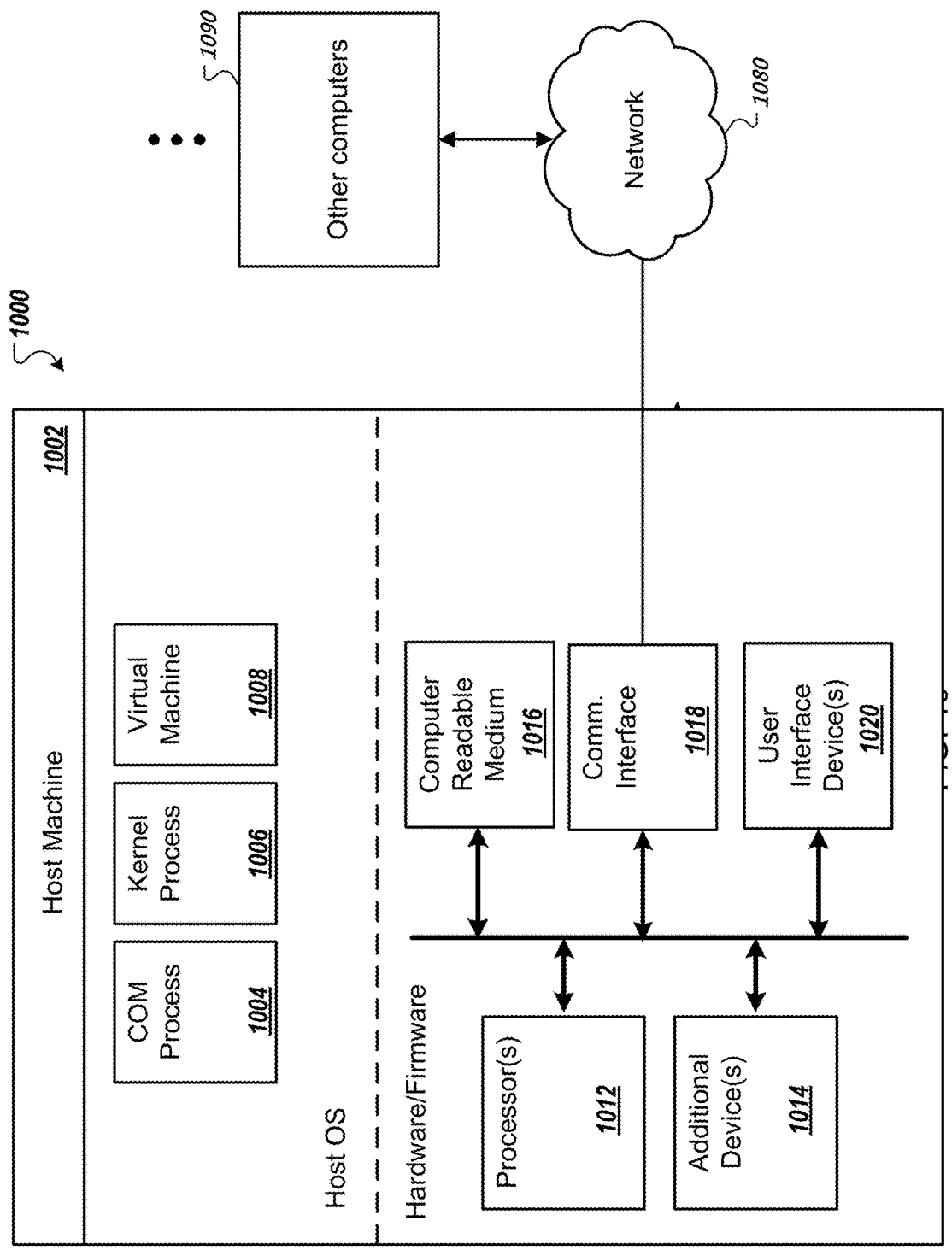
FIG. 10 is a schematic diagram of an example host machine.

FIG. 10 is a schematic diagram of an example host machine. The host machine 1000 generally consists of a data processing apparatus 1002. The data processing apparatus 1002 can optionally communicate with one or more other computers 1090 through a network 1080. While only one data processing apparatus 1002 is shown in FIG. 10, multiple data processing apparatus can be used in one or more locations. The data processing apparatus 1002 includes various modules, e.g. executable software programs. One of the modules is the kernel 1006 of a host operating system (e.g., host operating system 106). A communication process module 1004 (e.g., communication process 106c) is configured to establish VNPs, encapsulate packets and to de-encapsulate packets. A virtual machine module 1008 (e.g., virtual machine 110) includes virtual hardware (e.g., virtual hardware 110a), a guest operating system (e.g., guest operating system 110b), and guest applications (guest applications 110c). Although several software modules are illustrated, there may be fewer or more software modules. Moreover, the software modules can be distributed on one or more data processing apparatus connected by one or more networks or other suitable communication mediums.

The data processing apparatus 1002 also includes hardware or firmware devices including one or more processors 1012, one or more additional devices 1014, a computer readable medium 1016, a communication interface 1018, and optionally one or more user interface devices 1020. Each processor 1012 is capable of processing instructions for execution within the data processing apparatus 1002. In some implementations, the processor 1012 is a single or multi-threaded processor. Each processor 1012 is capable of processing instructions stored on the computer readable medium 1016 or on a storage device such as one of the additional devices 1014. The data processing apparatus 1002 uses its communication interface 1018 to communicate with one or more computers 1090, for example, over a network 1080. Examples of user interface devices 1020 include a display, a camera, a speaker, a microphone, a tactile feedback device, a keyboard, and a mouse. The data processing apparatus 1002 can store instructions that implement operations associated with the modules described above, for example, on the computer readable medium 1016 or one or more additional devices 1014, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method when executed by data processing hardware of a gateway module associated with a virtual private network causes the data processing hardware to perform operations comprising:
  receiving, from a client external to the virtual private network, a packet to be sent to one of a plurality of virtual machines executing on the virtual private network, each respective virtual machine associated with a corresponding internal internet protocol (IP) address, the packet comprising:
    a destination IP address associated with the gateway module; and
    a destination port;
  determining a load balancing scheme based on the destination port;

selecting a respective one of the virtual machines from among the plurality of virtual machines based on the load balancing scheme;

replacing the destination IP address of the packet with the corresponding internal IP address associated with the respective one of the virtual machines; and sending the packet to the corresponding internal IP address associated with the respective one of the virtual machines.

2. The computer-implemented method of claim 1, wherein the packet further comprises:

a source internet protocol (IP) address assigned to the client; and a source port of a host machine assigned to the client.

3. The computer-implemented method of claim 1, wherein the operations further comprise, prior to receiving the packet, encapsulating a data portion of the packet.

4. The computer-implemented method of claim 3, wherein encapsulating the data portion of the packet comprises encrypting at least a portion of the data portion of the packet using a Diffie-Hellman protocol.

5. The computer-implemented method of claim 1, wherein the operations further comprise requesting a token from a registry service, the token used to establish a unidirectional virtual network pair from the client to the respective one of the virtual machines.

6. The computer-implemented method of claim 5, wherein the token comprises a validity period defining a time when the token expires.

7. The computer-implemented method of claim 6, wherein prior to sending the packet to the corresponding internal IP address associated with the respective one of the virtual machines, determining that the validity period for the token is satisfied.

8. The computer-implemented method of claim 7, wherein determining that the validity period for the token is satisfied occurs at the data processing hardware of the gateway module.

9. The computer-implemented method of claim 1, wherein the operations further comprise storing an association between the destination port and the corresponding internal IP address associated with the respective one of the virtual machines.

10. The computer-implemented method of claim 1, wherein the operations further comprise providing, using anycast, the destination IP address associated with the gateway module to the client.

11. A system comprising:

data processing hardware; and memory hardware in communication with the data processing hardware, the memory hardware storing instructions that when executed on the data processing hardware cause the data processing hardware to perform operations comprising:

receiving, at a gateway module associated with a virtual private network, from a client external to the virtual private network, a packet to be sent to one of a plurality of virtual machines executing on the virtual private network, each respective virtual machine associated with a corresponding internal internet protocol (IP) address, the packet comprising:

a destination IP address associated with the gateway module; and a destination port;

determining a load balancing scheme based on the destination port;

selecting a respective one of the virtual machines from among the plurality of virtual machines based on the load balancing scheme;

replacing the destination IP address of the packet with the corresponding internal IP address associated with the respective one of the virtual machines; and sending the packet to the corresponding internal IP address associated with the respective one of the virtual machines.

12. The system of claim 11, wherein the packet further comprises:

a source internet protocol (IP) address assigned to the client; and a source port of a host machine assigned to the client.

13. The system of claim 11, wherein the operations further comprise, prior to receiving the packet, encapsulating a data portion of the packet.

14. The system of claim 13, wherein encapsulating the data portion of the packet comprises encrypting at least a portion of the data portion of the packet using a Diffie-Hellman protocol.

15. The system of claim 11, wherein the operations further comprise requesting a token from a registry service, the token used to establish a unidirectional virtual network pair from the client to the respective one of the virtual machines.

16. The system of claim 15, wherein the token comprises a validity period defining a time when the token expires.

17. The system of claim 16, wherein prior to sending the packet to the corresponding internal IP address associated with the respective one of the virtual machines, determining that the validity period for the token is satisfied.

18. The system of claim 17, wherein determining that the validity period for the token is satisfied occurs at the data processing hardware of the gateway module.

19. The system of claim 11, wherein the operations further comprise storing an association between the destination port and the corresponding internal IP address associated with the respective one of the virtual machines.

20. The system of claim 11, wherein the operations further comprise providing, using anycast, the destination IP address associated with the gateway module to the client.

* * * * *